United States Patent Office 3,101,341
Patented Aug. 20, 1963

3,101,341
1-BENZHYDRYL SUBSTITUTED 4-(AMINO-METHYL)PIPERIDINES AND 4-(AMIDO-METHYL)PIPERIDINES
John W. Cusic, Skokie, and Ernest Le Von, Morton Grove, Ill., assignors to G. D. Searle & Co., Chicago, Ill., a corporation of Delaware
No Drawing. Filed Apr. 5, 1961, Ser. No. 100,827
10 Claims. (Cl. 260—293)

The present invention relates to a group of N-benzhydrylpiperidines which can be represented by the following general formula

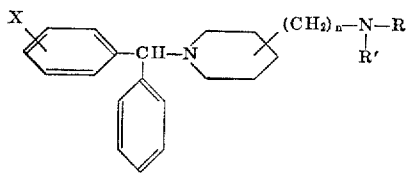

wherein X is a member of the group consisting of hydrogen, methyl, and halogen; R is selected from the group consisting of hydrogen and methyl; R' is selected from the group consisting of hydrogen, lower alkyl and lower alkanoyl; and n is 0 or 1. Typically, R' can be hydrogen, ethyl, butyl, acetyl, or butyryl. That is, R' contains fewer than 7 carbon atoms.

The compounds of this invention possess useful anti-inflammatory activity. More specifically, they have a phenylbutazone-like effect on edematous conditions. Safety and effectiveness in human beings has not been established at this time.

The organic bases of this invention form nontoxic, acid-addition salts with a variety of organic and inorganic acids. Such salts are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic and related aids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

To prepare the compounds of this invention, an appropriately substituted benzhydryl chloride is heated with a substituted piperidine of the type

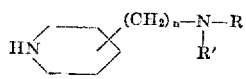

wherein R, R', and n are defined as above except that R' cannot by hydrogen and when R is hydrogen, R' must be alkanoyl. The reaction is carried out in an appropriate inert solvent such as butanone. Alternately the amides of this invention can be prepared by mixing an amine of the general formula

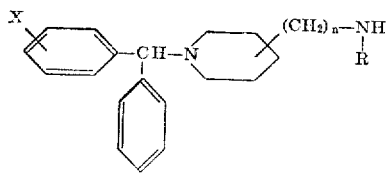

wherein n and R are defined as above with an acyl halide in the presence of a base such as sodium carbonate.

The compounds of this invention lacking an amide functional group can also be prepared conveniently by hydrolyzing the appropriate N-acyl compound by refluxing it with hydrochloric acid. Alternately, these amines can be prepared by reduction of the appropriate amide of this invention with lithium aluminum hydride.

The preparation of these compounds will appear more fully from a consideration of the following examples which are given for the purpose of illustration only and are not to be construed as limiting the invention in spirit or scope. In these examples quantities are indicated as parts by weight, temperatures in degrees centigrade (° C.) and pressures in millimeters of mercury (mm.) or atmospheres (atm.).

Example 1

A solution of 24.7 parts of 3-acetamidopyridine in 100 parts of ethyl alcohol, 25 parts of water and 20 parts of concentrated hydrochloric acid is hydrogenated over 2 parts of platinum oxide at a pressure of 3 atmospheres. The solvent is removed from the resultant mixture and the residue is triturated with ether to give 3-acetamidopiperidine hydrochloride melting at about 165–169° C.

Example 2

75 parts of acetic anhydride is added portionwise to a solution of 65 parts of 3-picolylamine in 200 parts of pyridine. The excess anhydride, acetic acid and pyridine are removed at reduced pressure. Distillation of the residue gives 3-acetamidomethylpyridine boiling at about 140–145° C. at 0.07 mm. pressure.

A solution of 71 parts of 3-acetamidomethylpyridine in 1000 parts of ethanol is hydrogenated over 7.1 parts of ruthenium oxide at 100° and 27–68 atmospheres. The resultant mixture is filtered and distilled to give 3-acetamidomethylpiperidine boiling at about 125° C. at about 0.1 mm. pressure.

Example 3

95 parts of acetic anhydride is added portionwise to a mixture of 92 parts of 3-picolylmethylamine and 200 parts of pyridine. The temperature is raised to about 100° C. before the mixture is cooled. The solvent, acetic acid and excess anhydride are removed at reduced pressure. The residual product is distilled to give 3-(N-methylacetamidomethyl)pyridine boiling at about 135–145° C. at about 0.1 mm. pressure. A solution of 104 parts of this amide in 1000 parts of alcohol is hydrogenated over 10.4 parts of ruthenium oxide at 100° C. and 34–68 atmospheres. Distillation of the solution remaining after removal of the catalyst gives 3-(N-methylacetamidomethyl)piperidine boiling at about 105–110° C. at about 0.1 mm. pressure.

Example 4

A mixture of 10 parts of 2-methylbenzhydryl chloride, 10 parts of 3-acetamidopiperidine hydrochloride, 20 parts of potassium carbonate and 1 part of sodium iodide in 405 parts of butanone is stirred and refluxed for 5 days. The mixture is filtered to remove insoluble solids, the filtrate is concentrated, and the residue is dissolved in benzene and washed with water. When 50 parts of 1 N hydrochloric acid is added to the benzene solution, a solid hydrochloride precipitates. This is filtered, dried and recrystallized from a mixture of 32 parts of methanol and 53 parts of ether to give 1-(2-methylbenzhydryl)-3-acetamidopiperidine hydrochloride melting at about 231–

234° C. The free base of this compound has the following formula

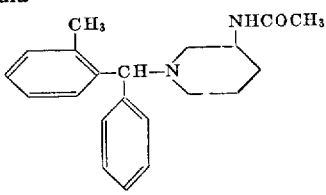

Example 5

A mixture of 7 parts of 3-acetamidomethylpiperidine, 11 parts of 4-chlorobenzhydryl chloride, 7 parts of potassium carbonate and 202 parts of butanone is stirred and refluxed for 15 hours. The mixture is cooled and filtered to remove inorganic salts. The solvent is removed under reduced pressure. The residue is dissolved in benzene and the resultant solution is washed thoroughly with water. The benzene solution is extracted with 50 parts of 1 N hydrochloric acid and 100 parts of warm water. The acidic extract is washed with benzene and alkalized and the resultant mixture is extracted with benzene. Evaporation of the solvent from the benzene solution leaves a sticky syrup which is 1-(4-chlorobenzhydryl)-3-acetamidomethylpiperidine. After recrystallization from ethanol, the picrate of this compound melts at about 202–205° C. with decomposition. The free base has the following formula

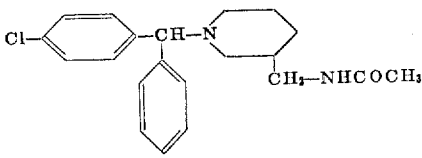

If equivalent quantities of the appropriate benzhydryl chloride are substituted for the 4-chlorobenzhydryl chloride and the above procedure is repeated, the following compounds are obtained:
1-(2-chlorobenzhydryl)-3-acetamidomethylpiperidine.
1-(4-iodobenzhydryl)-3-acetamidomethylpiperidine.
1-(4-fluorobenzhydryl)-3-acetamidomethylpiperidine.

Example 6

A mixture of 7 parts of 3-acetamidomethylpiperidine, 10 parts of benzhydryl chloride, 7 parts of potassium carbonate and 1 part of sodium iodide in 240 parts of butanone is stirred and refluxed for 45 hours. The insoluble inorganic salts are filtered from the reaction mixture and the solvent is removed under reduced pressure. The benzene solution of the residue is washed with water and extracted with 50 parts of 1 N hydrochloric acid. The acidic extract is washed with benzene and alkalized and the resultant mixture is extracted with benzene. Evaporation of the solvent from the benzene solution under vacuum leaves a sticky product which crystallizes on standing to give 1-benzhydryl-3-acetamidomethylpiperidine melting at about 98–102° C.

Example 7

To hydrolyze 1-benzhydryl-3-acetamidomethylpiperidine, 22.5 parts of the amide is refluxed in 560 parts of 3 N hydrochloric acid for 24 hours. The mixture is cooled, washed with benzene, alkalized, and extracted with benzene. The benzene solution is dried and concentrated to yield crude 1-benzhydryl-3-aminomethylpiperidine. A solution of 5 parts of the crude base in 20 parts of 2-propanol is mixed with a solution of maleic acid in 25 parts of 2-propanol. Addition of a mixture of 2-propanol and ether precipitates the salt. Recrystallization of the product from a mixture of 2-propanol and ether gives 1-benzhydryl-3-aminomethylpiperidine dimaleate melting at about 159–162° C. with decomposition.

Example 8

Five parts of crude 1-benzhydryl-3-aminomethylpiperidine in 176 parts of benzene is stirred with 10 parts of potassium carbonate and a solution of 2.6 parts of butyryl chloride in 44 parts of benzene is added portionwise over 30 minutes. The mixture is allowed to stand for 2 hours before it is shaken with an aqueous solution containing 1 part of sodium hydroxide. The benzene solution is washed with water and extracted with dilute hydrochloric acid. The acidic solution is alkalized and extracted with benzene. The benzene solution is dried and the solvent is evaporated under reduced pressure to leave a sticky syrup which is 1-benzhydryl-3-butyramidomethylpiperidine. The picrate of this compound melts at about 213° C. with decomposition.

Example 9

A mixture of 7.6 parts of 3-(N-methylacetamidomethyl)piperidine, 11 parts of 4-chlorobenzhydryl chloride, 7 parts of potassium carbonate and 0.1 part of potassium iodide in 202 parts of butanone is stirred and refluxed for 48 hours. The mixture is filtered to remove insoluble inorganic salts and the solvent is removed under reduced pressure. The residue is dissolved in benzene, washed with water and extracted with 50 parts of 1 N hydrochloric acid. The acidic solution is washed with benzene, alkalized, and extracted with benzene. The solvent is evaporated from the benzene solution under reduced pressure to leave a sticky material which is 1-(4-chlorobenzhydryl) - 3 - (N-methylacetamidomethyl)piperidine. After recrystallization from ethanol, the picrate of this compound melts at about 220–223° C. with decomposition. This compound has the formula

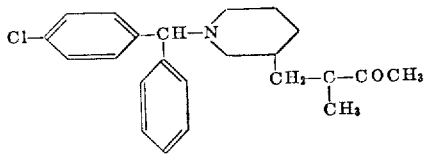

Example 10

A mixture of 45 parts of benzhydryl chloride, 30 parts of 4-(N-methylacetamidomethyl)piperidine, 60 parts of potassium carbonate and 5 parts of sodium iodide in 1215 parts of butanone is stirred and refluxed for 4 days. The insoluble inorganic salts are filtered from the mixture and the solvent is removed from the filtrate under reduced pressure. A solution of the residue in benzene is washed with water and extracted with 1 N hydrochloric acid. The acidic extract is washed with benzene and alkalized and the resultant mixture is extracted with benzene. Evaporation of the solvent from the benzene solution leaves a crude oily product which crystallizes on standing. Two recrystallizations from hexane give 1-benzhydryl-4-(N-methylacetamidomethyl)piperidine melting at about 92–96° C. After recrystallization from a mixture of methanol, 2-propanol, and ether, the oxalate of this compound melts at about 147–152° C. with decomposition.

Example 11

Fifteen parts of crude 1-benzhydryl-4-(N-methylacetamidomethyl)piperidine in 300 parts of 3 N hydrochloric acid is refluxed for 2 days. The solution is decanted from a small amount of insoluble oil and washed with benzene. The aqueous solution is alkalized and extracted with benzene and the benzene solution is washed with water, dried over potassium carbonate and concentrated. The residual base is recrystallized from hexane to give 1-benzhydryl-4-methylaminomethylpiperidine melting at about 74–76° C. This product has the following formula

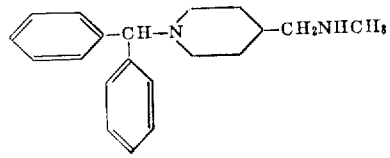

Example 12

To a suspension of 4 parts of lithium aluminum hydride in 560 parts of dry tetrahydrofuran is added portionwise a solution of 10 parts of 1-benzhydryl-4-(N-methylacetamidomethyl)piperidine in 140 parts of tetrahydrofuran. The mixture is refluxed overnight and the excess lithium aluminum hydride is decomposed by the addition of 4.5 parts of ethyl acetate. The reaction mixture is hydrolyzed by successively adding 4 parts of water, 5 parts of 5 N sodium hydroxide solution and 12 parts of water. The reaction mixture is filtered to remove the precipitate, and the solid is washed with tetrahydrofuran. The filtrate is dried over potassium carbonate and the solvent is removed under reduced pressure to leave a residue which is crude 1-benzhydryl-4-(N-ethyl)methylaminomethylpiperidine. After recrystallization from a mixture of methanol, 2-propanol and ether, the monooxalate of this compound melts at about 187–190° C. with decomposition. The free base of this compound has the formula

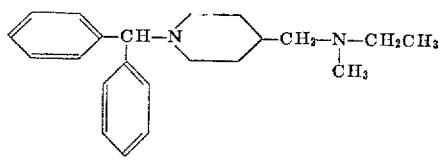

What is claimed is:

1. A compound of the formula

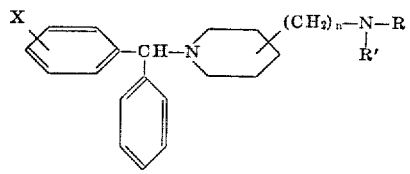

wherein X is selected from the group consisting of hydrogen, methyl, and halogen; R is selected from the group consisting of hydrogen and methyl; R' is selected from the group consisting of hydrogen, lower alkyl, and lower alkanoyl; and $n$ is an integer between 0 and 1 inclusive.

2. A compound of the formula

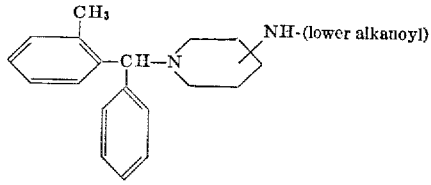

3. 1-(2-methylbenzhydryl)-3-acetoamidopiperidine.
4. 1-benzhydryl-3-aminomethylpiperidine.
5. 1-benzhydryl-3-acetamidomethylpiperidine.
6. 1 - benzhydryl-4-(N-methylacetamidomethyl)piperidine.
7. 1-benzhydryl-4-(N-ethyl)methylaminomethylpiperidine.
8. A compound of the formula

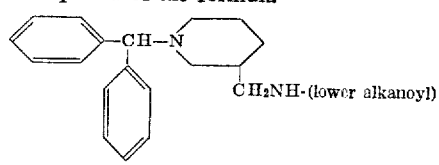

9. A compound of the formula

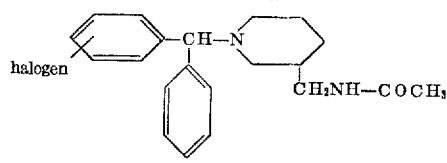

10. 1 - (4-chlorobenzhydryl)-3-acetamidomethylpiperidine.

No references cited.

UNITED STATES PATENT OFFICE
CERTIFICATE OF CORRECTION

Patent No. 3,101,341                        August 20, 1963

John W. Cusic et al.

It is hereby certified that error appears in the above numbered patent requiring correction and that the said Letters Patent should read as corrected below.

Column 4, lines 32 to 38, for that portion of the formula reading

Signed and sealed this 25th day of February 1964.

(SEAL)
Attest:

ERNEST W. SWIDER                      EDWIN L. REYNOLDS

Attesting Officer                      Acting Commissioner of Patents